United States Patent
Rokusek et al.

(10) Patent No.: US 8,973,104 B2
(45) Date of Patent: Mar. 3, 2015

(54) METHOD AND SYSTEM FOR PROVIDING LIMITED USAGE OF AN ELECTRONIC DEVICE

(71) Applicant: Motorola Mobility LLC, Libertyville, IL (US)

(72) Inventors: Daniel S. Rokusek, Long Grove, IL (US); Edward D. Brann, Lake Bluff, IL (US); Sanjay Gupta, Lakewood, IL (US); David A. Vanyek, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 69 days.

(21) Appl. No.: 13/731,653

(22) Filed: Dec. 31, 2012

(65) Prior Publication Data

US 2014/0189801 A1 Jul. 3, 2014

(51) Int. Cl.
*G06F 7/00* (2006.01)
*G06F 21/00* (2013.01)

(52) U.S. Cl.
CPC ...................................... *G06F 21/00* (2013.01)
USPC ............... 726/4; 710/303; 710/304; 455/418; 726/17; 726/34

(58) Field of Classification Search
USPC ............ 726/4, 17, 34; 455/418; 710/303, 304
See application file for complete search history.

(56) References Cited

U.S. PATENT DOCUMENTS

| | | | |
|---|---|---|---|
| 2006/0161668 A1* | 7/2006 | Mathew et al. | 709/229 |
| 2007/0277230 A1* | 11/2007 | Hawkins et al. | 726/4 |
| 2009/0153297 A1* | 6/2009 | Gardner | 340/5.83 |
| 2011/0099316 A1* | 4/2011 | Tseng et al. | 710/304 |
| 2011/0125601 A1* | 5/2011 | Carpenter et al. | 705/26.1 |
| 2011/0230209 A1* | 9/2011 | Kilian | 455/456.3 |
| 2011/0239292 A1* | 9/2011 | Little et al. | 726/17 |
| 2012/0096207 A1* | 4/2012 | Chen | 710/303 |
| 2012/0253552 A1* | 10/2012 | Skelton | 701/2 |
| 2013/0151111 A1* | 6/2013 | Skelton | 701/99 |
| 2013/0178234 A1* | 7/2013 | Jones et al. | 455/456.4 |
| 2013/0205110 A1* | 8/2013 | Kettner | 711/170 |
| 2013/0278405 A1* | 10/2013 | Bacal | 340/439 |
| 2013/0295908 A1* | 11/2013 | Zeinstra et al. | 455/418 |

(Continued)

FOREIGN PATENT DOCUMENTS

WO 2012006480 A2 1/2012

OTHER PUBLICATIONS

Dock Awake: Prevent your display from sleeping while docked!, http://www.dockawake.com/, Jun. 20, 2012, pp. 1-2.

(Continued)

*Primary Examiner* — Beemnet Dada
*Assistant Examiner* — Sayed Beheshti Shirazi
(74) *Attorney, Agent, or Firm* — Shumaker & Sieffert, P.A.

(57) ABSTRACT

An electronic device (100) includes a control circuit (208) and one or more modules (210) operable with the control circuit. An application usage module (211) is operable with the control circuit to define one or more applications (104, 105, 106, 107), operable with the control circuit and otherwise available for use by a user (101) when the electronic device is in an unlocked state, that are precluded from use by an authorized person when the electronic device is operably connected to a predefined peripheral accessory (300) when unlocked.

21 Claims, 10 Drawing Sheets

(56) References Cited

U.S. PATENT DOCUMENTS

2014/0012979 A1* 1/2014 Seo .............................. 709/224
2014/0075075 A1* 3/2014 Morrill et al. ................. 710/303

OTHER PUBLICATIONS

Car Widget Pro, https://play.google.com/store/apps/details?id=com.anod.car.home.pro&hl=en, Jun. 20, 2012, pp. 1-2.

NFC Task Launcher, https://play.google.com/store/apps/details?id=com.jwsoft.nfcactionlauncher&feature=search_result, Jun. 20, 2012, pp. 1-2.

Safe Drive Free, https://play.google.com/store/apps/details?id=com.incorporateapps.drivesafe&feature=search_result, Jun. 20, 2012, pp. 1-2.

Research in Motion, "BlackBerry Java SDK 6.0", https://bdsc.webapps.blackberry.com/java/documentation/ww_java_os_features/NITR_6_0_1970853_11.html, 2011, 17 pages.

* cited by examiner

METHOD AND SYSTEM FOR PROVIDING LIMITED USAGE OF AN ELECTRONIC DEVICE

TECHNICAL FIELD

This invention relates generally to electronic devices, and more particularly to method and systems for limiting usage of electronic devices.

BACKGROUND

Portable electronic devices are continually becoming more and more sophisticated and powerful. While mobile telephones are used to only accommodate voice communications, modern "smart phones" are now equipped with powerful processors that allow these devices to send text and multimedia messages, capture images and video, and even surf the web. Many portable electronic devices now have more processing power than did traditional desktop computers only a few years ago. For example, many mobile devices today can run a myriad of "apps," which are sophisticated software applications that do everything from manage a grocery list or family finances to diagnosing medical conditions. An improved electronic device would offer enhanced control over the myriad number of accessible applications.

Figure 1:
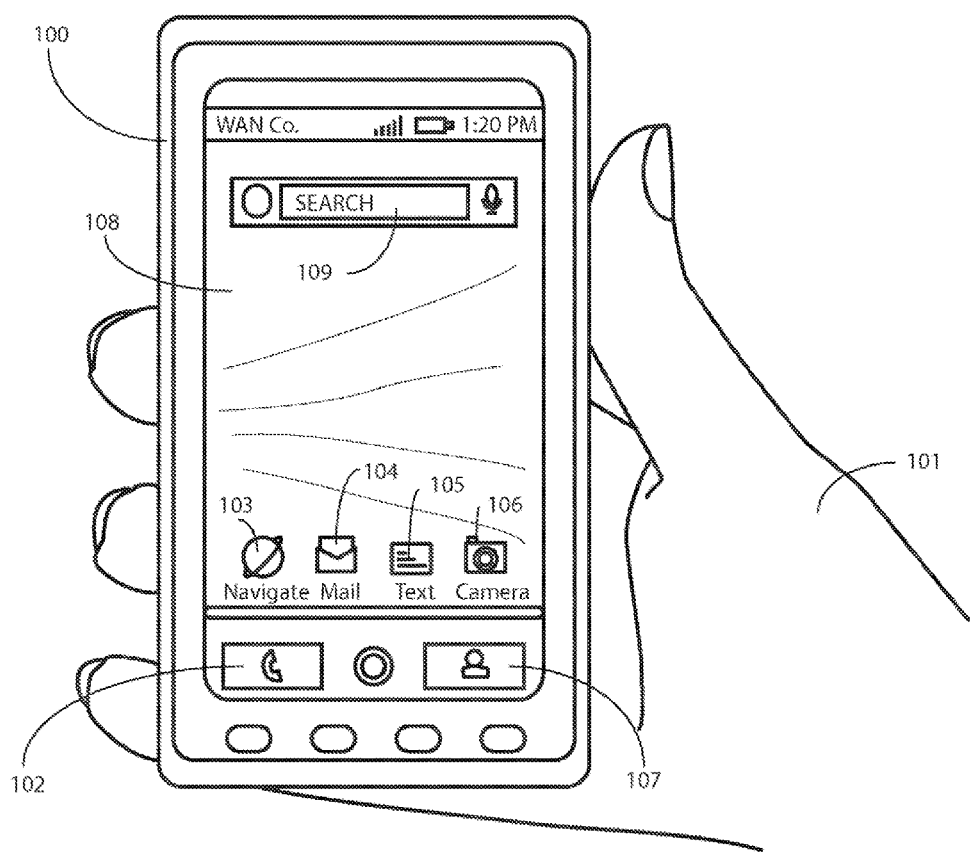
FIG. 1 illustrates one explanatory embodiment of an electronic device configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to providing limited usage of an electronic device, such as when the electronic device is operably coupled to a particular peripheral device, one example being a vehicular docking station. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of providing limited usage of an electronic device as described herein. The non-processor circuits may include, but are not limited to, a radio receiver, a radio transmitter, signal drivers, clock circuits, power source circuits, and user input devices. As such, these functions may be interpreted as steps of a method to perform the provision of limiting usage of the electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention provide an electronic device for, and method of providing, limited usage when the electronic device is operably connected to a predefined peripheral device. For example, when an electronic device, such as a smartphone, is coupled to a predetermined peripheral device, such as a vehicular docking station, the phone's user, a parent, corporate IT department, or other authorized administrator may want to limit functions that are accessible to an authorized user. A parent, for instance, may want their child to only have access to the telephone and navigation features of a smartphone or other electronic device while the device is coupled to a vehicular docking station to ensure that the child is less distracted while driving. Accordingly, embodiments of the invention can define certain applications that remain in a locked state or are otherwise precluded from use by the user when a predetermined peripheral device is connected. For example, in one embodiment, the method of providing limited usage of the electronic device begins with receiving an unlocking input, locally at a user interface of the electronic device, from the user. However, since the electronic device is configured to provide only limited usage in some environments, the control circuit of the electronic device can be configured to preclude the use of at least some applications of the electronic device that are otherwise available for use in the unlocked state while the electronic device is connected to the peripheral device, even after performing an unlocking operation in response to the unlocking input. Thus, the control circuit transitions the electronic device from a locked state to an unlocked state in response to the user input, but precludes the use of some applications by leaving them in a locked state so long as the electronic device is coupled to the peripheral accessory. Once the electronic device is operably decoupled from the accessory, such as when the driver exits the car to continue the vehicular example, the control circuit then makes all applications available in response to the unlocking input. In short, when the electronic device is coupled to a predetermined peripheral accessory and unlocked, only some applications are available for use in one embodiment. However, when the electronic device is not coupled to a particular peripheral accessory and unlocked, all applications are available for use as normal.

Turning now to FIG. 1, illustrated therein is an explanatory electronic device 100 configured in accordance with one or more embodiments of the invention. The illustrative electronic device 100 of FIG. 1 is shown as a smart phone for illustration. However, it will be obvious to those of ordinary skill in the art having the benefit of this disclosure that other portable electronic devices may be substituted for the explanatory smart phone of FIG. 1. For example, the electronic device 100 may be configured as a palm-top computer, a tablet computer, a gaming device, wearable computer, a media player, or other device.

A user 101 is holding the electronic device 100. The operating system environment, which is configured as executable code operating on one or more processors or control circuits of the electronic device 100, has associated therewith various applications or "apps." Examples of such applications shown in FIG. 1 include a cellular telephone application 102 for making voice telephone calls, a navigation application 103 configured to provide mapping and navigation information to the user on the display 108 of the electronic device 100, an electronic mail application 104 configured to send and receive electronic mail, a messaging application 105 configured to send and receive text messages (and optionally multimedia messages), a camera application 106 configured to capture still (and optionally video) images, and a social media application 107. An Internet and/or local search application 109 is also provided. The Internet and/or local search application 109 allows a user to search the web or the local device for items like contacts, lists, songs, media, desirous information on persons, places, and things, and so forth. These applications are illustrative only, as others will be obvious to one of ordinary skill in the art having the benefit of this disclosure.

Figure 2:
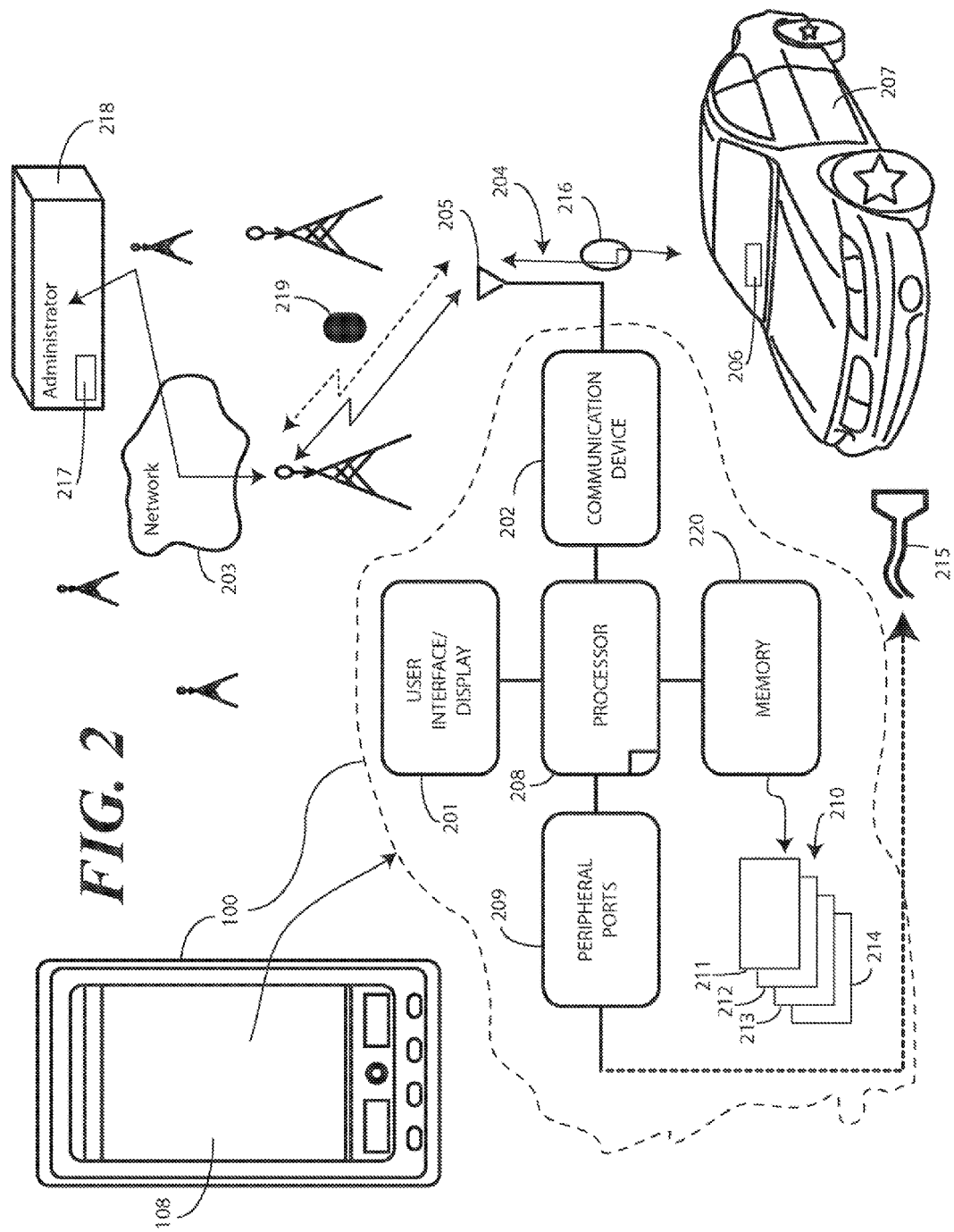
FIG. 2 illustrates one explanatory electronic device in an operational environment, along with a schematic block diagram and a network schematic, configured in accordance with one or more embodiments of the invention.

Turning now to FIG. 2, illustrated therein is the explanatory electronic device 100 in an operating environment, along with a schematic block diagram, incorporating explanatory embodiments of the present invention. As shown, the illustrative electronic device 100 may include standard components such a user interface 201, which may include the display 108, which may be touch-sensitive, and/or keypads, keyboards, user input devices, voice inputs, facial feature inputs, gesture inputs, and so forth. This illustrative electronic device 100 also includes a communication interface 202. The communication interface 202 can be configured for communication with one or more networks, such as the wide area network 203 and the local area network 204 that are shown in FIG. 2. The communication interface 202 can include wireless communication circuitry, one of a receiver, a transmitter, or transceiver, and an antenna 205.

In one or more embodiments, the communication interface 202 can be configured for data communication with at least one wide area network 203. For illustration, the wide area network 203 of FIG. 2 is shown as a cellular network being operated by a service provider. Examples of cellular networks include GSM, CDMA, W-CDMA, CDMA-2000, iDEN, TDMA, and other networks. It should be understood that the communication interface 202 could be configured to communicate with multiple wide area networks as well, with one being shown in FIG. 2 for simplicity.

The communication interface 202 can also be configured to communicate with a local area network 204, such as a Wi-Fi network being supported by a base station. Alternatively, the local area network 204 can be via a Bluetooth.sup.™ or other local area communication protocols. In one illustrative embodiment, the communication interface 202 is configured to communicate with a near field communication (NFC) wireless technology. Near field communication wireless technology provides a wireless communication protocol between the electronic device 100 and a peripheral accessory, such as the vehicular docking station 206 shown in FIG. 2. The communication interface 202 can wirelessly communicate with one or more peripheral devices via this near field wireless technology to provide tailored experiences based upon settings that correspond with a particular accessory. As the user (101) transitions environments throughout the day, the electronic device 100 seamlessly adapts its features automatically based on the peripheral accessory to which it is connected. Illustrating by example, when the user (101) selects settings such as lower screen brightness and alarm clock and news updates on the home screen for a particular peripheral accessory located in the home, the electronic device 100 can be configured to automatically revert to those settings every time the electronic device 100 is operably coupled to that peripheral device. Further, when the electronic device is moved from the home, for example, to a vehicle 207 having a vehicular docking station 206, the electronic device can be configured to authenticate the vehicular docking station 206 by exchanging data with the vehicular docking station 206 using the near field communication wireless technology. Accordingly, the electronic device 100 may be configured to automatically display, for example, the navigation application (103), thereby giving users a more personalized experience.

In this illustrative embodiment, the electronic device 100 includes a control circuit 208, which in FIG. 1 is illustrated as one or more processors. The control circuit 208 is responsible for performing the various functions of the device. The control circuit 208 can be a microprocessor, a group of processing components, one or more Application Specific Integrated Circuits (ASICs), programmable logic, or other type of processing device. The control circuit 208 can be operable with the user interface 201 and the communication interface 202, as well as various peripheral ports 209 that can be coupled to peripheral hardware devices via interface connections such as the wired connector 215 shown in FIG. 2. One example of such a peripheral hardware device is the vehicular docking station 206 disposed within the vehicle 207 of FIG. 1.

The control circuit 208 can be configured to process and execute executable software code to perform the various functions of the electronic device 100. A storage device 220, such as a memory module, stores the executable software code used by the control circuit 208 for device operation. The storage device 220 may also store identification information suitable for identifying the electronic device 100 or its user. For example, the control circuit 208 can identify the electronic device 100 to a peripheral device by transmitting the identification information through the communication interface 202.

The control circuit 208, in one embodiment, employs several modules 210 to effect the limited usage methods described below. These modules 210 include an application usage module 211, an authentication module 212, a selective unlocking module 213, and an administrator control module 214. These modules 210 can be configured as executable code in the form of software or firmware to execute the functions of embodiments of the invention. Such modules 210 can comprise instructions, such as control algorithms, that are stored in a computer-readable medium such as the memory described above. Such computer instructions can instruct processors or control circuit 208 to perform methods of limiting usage of the electronic device 100 or preventing access to one or more predetermined software applications in one or more embodiments. In other embodiments, additional modules could be provided as needed. In other embodiments, the control circuit 208 receives instructions from communication circuits and/or secure memory devices disposed within the peripheral device to effect the limited usage methods described below. One example of this latter embodiment will be described in more detail with reference to FIG. 3 below.

In one embodiment, the control circuit 208, working in tandem with the modules 210, can be configured to provide a method that limits usage of the electronic device 100 when the electronic device 100 is unlocked and operably connected with a predetermined peripheral device. Said differently, the control circuit 208 can provide a method for the user (101) to access a limited set of applications when the electronic device 100 is unlocked while inserted into—or wirelessly or otherwise coupled with—the vehicular docking station 206 or another predetermined peripheral device. This feature can advantageously be used by parents of young drivers who may desire that only a limited number of mobile applications be available when the young driver is in the car. Similarly, this feature can advantageously be used by corporate IT departments who may not want applications that disclose trade secret or other confidential information while an employee is driving or in another predefined environment. Further, the feature can advantageously be used by users themselves who desire a more simplified display configuration while driving or in other predefined environments. For example, where the predefined peripheral device is a headset, the user may only want media player applications to be accessible when the electronic device 100 is unlocked and coupled to the headset to provide a more streamlined user experience.

In one embodiment, the application usage module 211 is operable with the control circuit 208 to define one or more applications that, while otherwise available for use by the user (101) when the electronic device 100 is in the unlocked state, are precluded from use by the user (101) when the electronic device is operably connected to a predetermined peripheral device. For example, when the electronic device 100 is operably connected to the vehicular docking station 206, be it by way of a wired connector 215, wirelessly through the local area network 204, or otherwise, and the user (101) unlocks the device, in one embodiment only a subset of the applications running on the electronic device become available for use by the user. The user (101) is thus precluded from using a subset of the applications defined by the application usage module 211 when the electronic device 100 is both unlocked and coupled to the vehicular docking station 206. In other embodiments, one example of which will be discussed with reference to FIG. 3 below, the peripheral device can comprise a secure memory that reviews a security level indicator received from the electronic device 100 and facilitates preclusion application usage capabilities on the electronic device 100 based upon settings disposed in the secure memory. In these embodiments, the peripheral device can provide secure identification, application usage capabilities, and access level control information to electronic device 100, thus replicating or replacing many of the functions of the application usage module 211. In these embodiments, the application usage module 211 can preclude usage of select applications based upon information received from the secure memory of the peripheral device.

In one embodiment, the selective unlocking module 213 can be configured to preclude access to the subset of applications by keeping them locked. The selective unlocking module 213 can transition the electronic device 100 from a locked mode to an unlocked mode in response to unlocking input, such as a PIN or predefined recognizable pattern provided by the user at the user interface 201, maintaining the subset of applications in a locked state. Consequently, while the electronic device 100 is operably coupled to the vehicular docking station 206, in one embodiment there is nothing that the user (101) can do to unlock these applications other than disconnecting the electronic device 100 from the vehicular docking station 206 and then again providing the unlocking input. In embodiments where the peripheral device can comprise a secure memory that reviews a security level indicator received from the electronic device 100 and facilitates precludes application usage capabilities on the electronic device 100 based upon settings disposed in the secure memory, the selective unlocking module 213 can preclude access to the subset of applications based upon information received from the secure memory. In these embodiments, the selective unlocking module 213 is responsive to instructions received from the secure memory of the peripheral device, as the peripheral device is replicating or replacing many of the functions of the application usage module 211.

In one or more embodiments, this reduced usage feature may only be desirable with certain accessories. For example, presuming that a parent of a young driver configures the application usage module 211, or alternatively a secure memory module disposed in the peripheral device, to define applications such as the electronic mail application (104), the messaging application (105), and the social media application (107) to be "precluded" applications when the electronic device 100 is disposed within a vehicular docking station 206, the parent may want all applications to be available when the electronic device 100 is operably coupled with another peripheral accessory, such as a desktop charging station. To accommodate this "selective preclusion," in one embodiment the authentication module 212 can be configured to determine whether a particular peripheral device that is operably connected with the electronic device 100 is one of the predetermined peripheral devices with which the preclusion feature should be employed. In one embodiment, the authentication module 212 does this by receiving an identifier 216 from the peripheral device. In other embodiments, the authentication module 212 receives instructions from a secure memory disposed in the peripheral device. These instructions may include capabilities that the electronic device 100 should have when unlocked, or access levels to various operational components of the electronic device.

Where an identifier is used by the authentication module 212, in one embodiment, the identifier 216 is a general identifier. For example, the identifier 216 may be a code identifying a particular peripheral device as a vehicular docking station 206. The control circuit 208, working with the authentication module 212, can then determine that the preclusion feature is to be used with all vehicular accessories. Accordingly, the control circuit 208 may preclude one or more applications from use when the electronic device 100 is operably connected to the vehicular docking station 206 when unlocked. In another embodiment, the identifier 216 is a specific identifier that identifies a particular peripheral device. Illustrating by example, in one embodiment the identifier 216 is a specific serial number of a particular vehicular docking station 206. Accordingly, when in one particular vehicle, such as the user's personal vehicle, the control circuit 208 would be configured to enable the application preclusion feature. However, when coupled to a docking station in a commercial rental car, all applications would be available. These examples of identifiers are illustrative only, as others will be obvious to those of ordinary skill in the art having the benefit of this disclosure.

As noted above, in one embodiment the user (101) can configure the application usage module 211 by defining which applications are to remain locked or otherwise precluded from use when the electronic device 100 is coupled to a particular peripheral device and unlocked. The user (101) can, in one embodiment, do this through the user interface 201. However, there are applications in which someone other than the user (101) may have reason to configure the application usage module 211. Two have already been noted—a parent interested in limiting use of the electronic device 100 when a child is in a vehicle 207, or a corporate IT department that may want to limit what applications are available when in a predetermined location, such as within a car. To accommodate this "administrator control" of which applications remain locked or otherwise precluded from use when the electronic device 100 is coupled to a predetermined peripheral device and unlocked, in one embodiment the electronic device 100 comprises an administrator control module 214.

In one embodiment, the administrator control module 214 is operable with the application usage module 211 to restrict definition of the one or more applications, the predetermined peripheral device, or combinations thereof, to authorized administrators 218 only. Said differently, using an administrator access module 217, an authorized administrator 218 can communicate with the administrator control module 214 to define which applications are to be precluded from use with a particular peripheral accessory, with which peripheral accessories the applications are to be precluded from use, or combinations thereof. The administrator access module 217 can be used to restrict access to administrator functions, such as configuring the application usage module 211, only to authorized users, thereby allowing a restricted group of operators to perform privileged operations on the electronic device 100. Thus, a parent employing an administrator access module 217 on a home computer can log in and send instructions 219 across a wide area network 203 or local area network 204 to inform the application usage module 211 which applications are to be precluded from use when the electronic device 100 is coupled to a predefined peripheral accessory and unlocked. Examples of applications a parent may want to preclude from use when their child is driving may include the messaging application (105), the electronic mail application (104), combinations thereof, or other applications that may require substantial manual dexterity for use, including gaming applications, for example.

In one embodiment, access to the administrator access module 217 is controlled by having the authorized administrator 218 enter a special password or perform another specific login sequence. For example, authorized administrators can be identified by a username and password combination that is only provided to authorized administrators and not to the normal user (101) of a particular electronic device 100. Once an authorized administrator 218 is logged into the administrator access module 217, in one embodiment, authorized administrator 218 provides the instructions 219 initially to the administrator access module 217. When the administrator access module 217 receives the input instructions 219, in one embodiment it delivers that input to the administrator control module 214 of the electronic device 100 by way of the communication interface 202. The instructions 219 define one or more applications of the electronic device 100 that a user (101) is to be precluded from using when the electronic device 100 is unlocked by the user (101) and when operably connected to a predefined peripheral accessory. The administrator control module 214 can then function as previously described.

The administrator access module 217 can include other features as well. In one embodiment, the authorized administrator 218 can lock the administrator control module 214 of the electronic device 100 to prevent user override. Thus, a child driver in the vehicle 207 would not be able to access the administrator control module 214 to access the messaging application (105), for example, when the electronic device was operably coupled to the vehicular docking station 206. The parent or other authorized administrator 218 may optionally configure the administrator control module 214 to permit usage of the one or more applications of the electronic device 100 whenever the predefined peripheral accessory is disconnected from the electronic device 100. Thus, when the child driver parked the vehicle 207 and removed the electronic device 100 from the vehicular docking station 206 and again unlocked the device by entering a PIN or other unlocking input, such as a gesture input or facial feature input, all applications would once again be available for use in such an embodiment.

Figure 3:
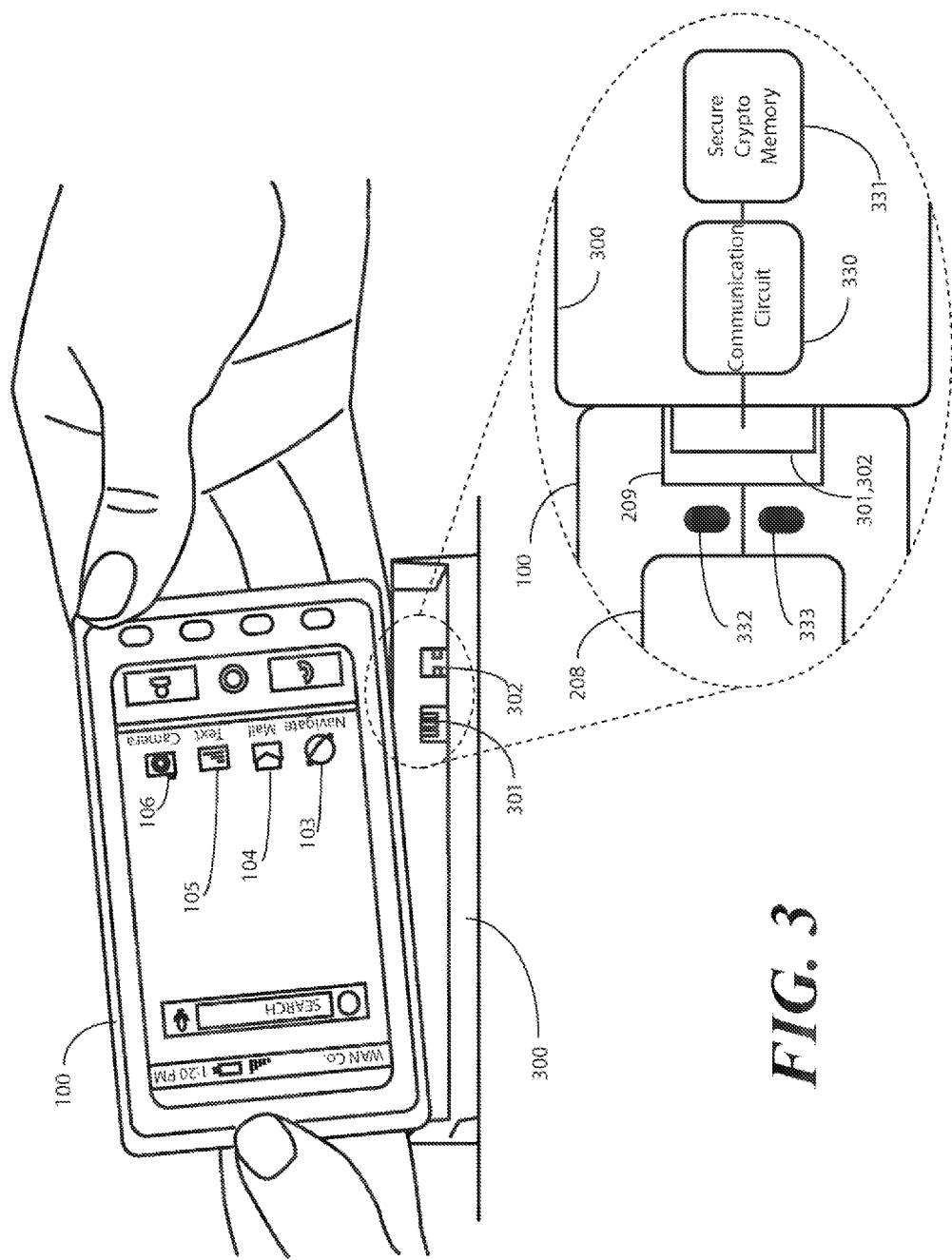
FIG. 3 illustrates one explanatory electronic device being operably coupled to a peripheral hardware device to in accordance with one or more embodiments of the invention.

While some embodiments of the invention have been described above with reference to FIG. 2, FIGS. 3-6 provide some use cases to illustrate one embodiment of the invention in operation. Beginning with FIG. 3, illustrated therein is the electronic device 100 of FIG. 1 being coupled to a predefined peripheral accessory 300. In this illustrative embodiment, the predefined peripheral accessory 300 is a docking station that includes electronic circuitry and couples to the electronic device by way of one or more physical connectors 301,302. As noted above, a physical connection to the predefined peripheral accessory 300 is but one mechanism for operable coupling between the two devices. Another mechanism is by way of a wired connection. Another mechanism is by way of near field communication such as Bluetooth.sup.™, near field wireless communication technologies, or other near field communication protocols. Other mechanisms for operably coupling the electronic device 100 to the predefined peripheral accessory 300 will be obvious to those of ordinary skill in the art having the benefit of this disclosure.

In one or more embodiments, once the electronic device 100 is coupled to the predefined peripheral accessory 300, an authentication step occurs. For instance, the control circuit 208 of the electronic device 100 may read identification data from the predefined peripheral accessory to determine generic, specific, or other device identifiers as previously described. Additionally, where the electronic device 100 includes an embedded energy source, such as a rechargeable battery, and the predefined peripheral accessory 300 is a charging station, information disposed within a memory, processor, or sensory component of the predefined peripheral accessory 300 can inform the control circuit 208 of the electronic device regarding voltage, current, or other energy parameters that are to be delivered to the electronic device via the physical connectors 301,302.

Of course, the authentication step can include authentication module (212) verifying the identity of the predefined peripheral accessory 300 and determining whether the predefined peripheral accessory 300 is one with which certain applications should be precluded from use when the electronic device 100 is operably coupled with the predefined peripheral accessory 300. In one or more embodiments, the control circuit 208 of the electronic device 100 can detect the connection of the predefined peripheral accessory 300 via its peripheral ports 209 when the predefined peripheral accessory 300 is coupled to the electronic device 100. The authentication module (212) can then reference a stored list of peripheral devices stored within a storage device (220) or memory of the electronic device to determine whether the attached device is found in a list with which applications should be precluded. Where the identity of the predefined peripheral device is found in the stored list, the application usage module (211) can preclude use when the electronic device is unlocked.

In another embodiment, the peripheral accessory 300 can be configured to facilitate the application usage preclusion. For example, if government entities were to pass legislation to preclude usage of certain applications where driving, a peripheral accessory 300 configured in accordance with one or more embodiments of the invention could be configured to control the electronic device 100 by precluding usage of applications as follows: When the electronic device 100 is coupled to the peripheral accessory 300, the control circuit 208 can send an information 332 to the peripheral accessory 300. In one embodiment, the information 332 can include an identifier of the electronic device 100. In another embodiment, the information 332 can include a security level corresponding to a user of the electronic device 100. For example, the security level can identify whether the user is a user or an administrator. Other data can be included in the information 332 as well, such as the manufacturer, model, or serial number of the electronic device 100, the serial number, and so forth.

When the peripheral device 300 receives the information 332 via a communication circuit 330 operably coupled to the physical connectors 301, 302, the communication circuit 330 can deliver the information to a secure memory 331 disposed within the peripheral accessory 300. In one embodiment, the secure memory 331 is a secure crypto memory. As noted above, where the peripheral accessory 300 provides the control, the secure memory 331 replicates or replaces many of the functions of the application usage module (211) of other embodiments. Accordingly, the information 332 can be reviewed in the secure memory 331 to determine which applications should be precluded from usage or other information. The secure memory 331 can then provide secure data 333 to the control circuit 208 that includes identification, capabilities, and access levels to the electronic device 100. In such an embodiment, the authentication module (212) receives the secure data 333. The selective unlocking module (213) can then preclude access to the subset of applications based upon the secure data 333 received from the secure memory 331. In these embodiments, the selective unlocking module (213) is responsive to instructions in the secure data 333 received from the secure memory 331 of the peripheral accessory 333. The selective unlocking module (213) accordingly precludes usage of applications based upon the secure data received from the peripheral accessory 300.

In the illustrative embodiment of FIG. 3, it should be noted that the electronic device 100 is in the unlocked state. This is evidenced by the fact that the various applications 103, 104, 105, 106 are available for use. That the electronic device 100 is in the unlocked state is not a requirement, however, as it could have also been in the locked state as well. Since the electronic device 100 was transformed to the unlocked state prior to operably connecting with the predefined peripheral accessory 300, all applications are available for use as the application usage module (211) is not precluding access to any of the applications.

Figure 4:
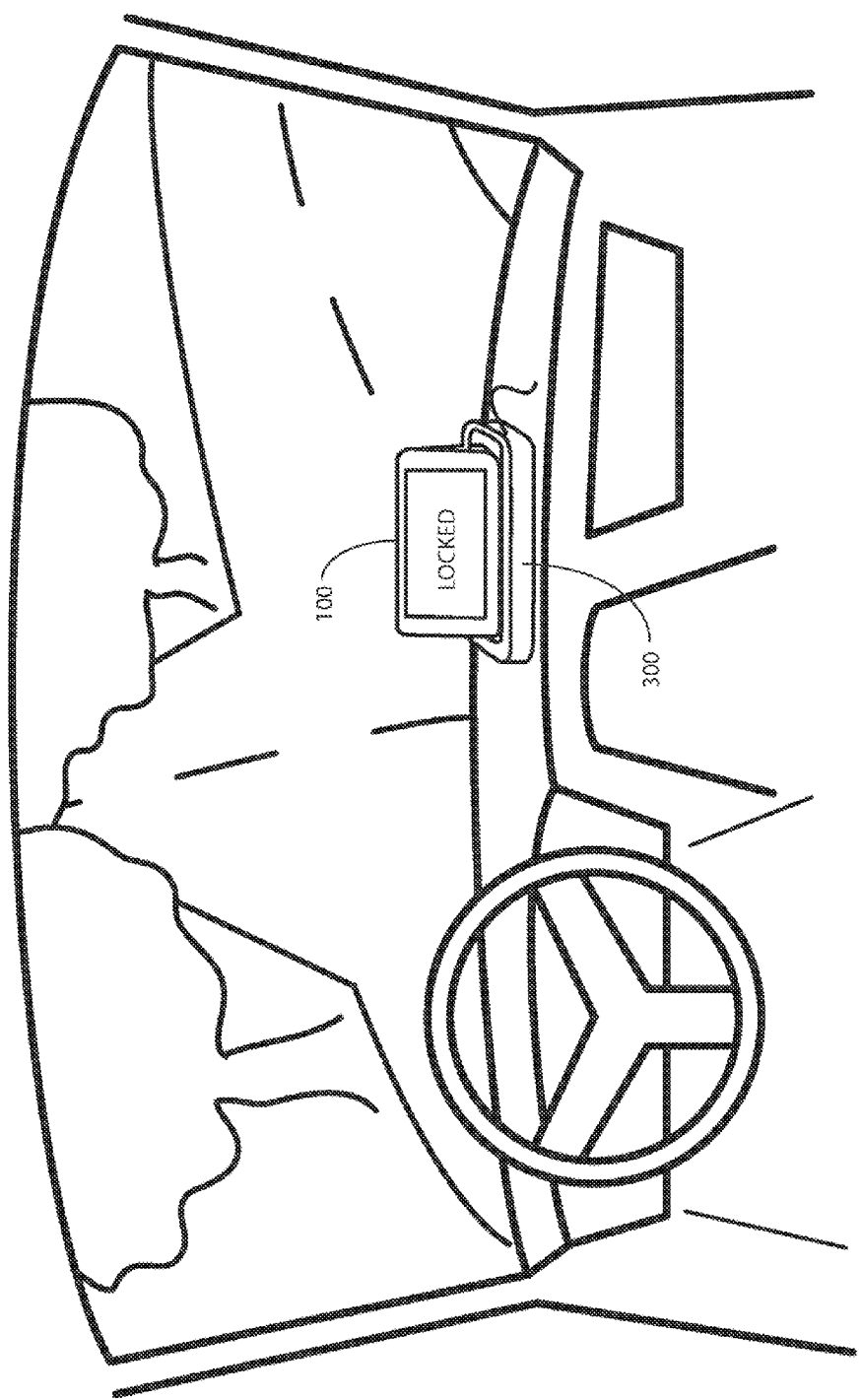
FIG. 4 illustrates one explanatory electronic device in an operating environment and configured in accordance with one or more embodiments of the invention.

Turning now to FIG. 4, the electronic device 100 is shown in the locked state while being operably connected or coupled to the predefined peripheral accessory 300, which is illustrated as a vehicular docking station. The electronic device 100 can transform from the unlocked state shown in FIG. 3 to the locked state shown in FIG. 4 for a variety of reasons. The user (101) can affirmatively lock the electronic device 100 through the user interface (201). Alternatively, the electronic device 100 may have a timer that can be set by the user (101) or an authorized administrator (218). Upon expiration of the timer, the electronic device 100 may automatically transition to the locked state. In other embodiments, the electronic device 100 may automatically enter a low power or sleep mode to conserve energy. In some embodiments, entry into the low power or sleep mode may automatically lock the device. Other mechanisms for transforming the electronic device 100 from the unlocked state to the locked state will be obvious to those of ordinary skill in the art having the benefit of this disclosure.

Figure 5:
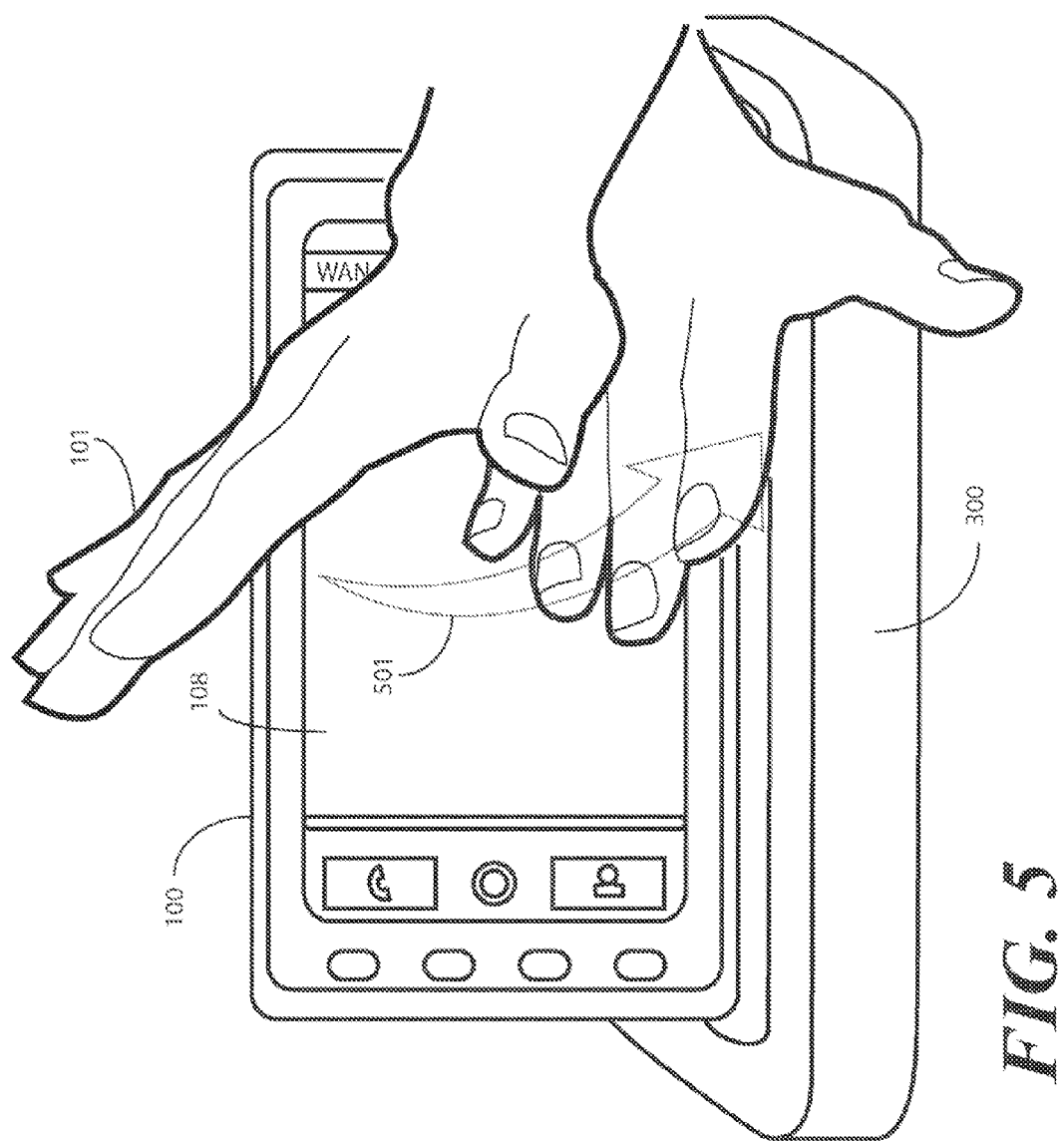
FIG. 5 illustrates a user providing local unlocking input to an electronic device configured in accordance with one or more embodiments of the invention.

Turning now to FIG. 5, the user 101 is delivering an unlocking input 501 to the display 108 of the electronic device 100. The control circuit (208) receives this unlocking input 501 locally by way of the user interface (201). In this illustrative embodiment, the unlocking input 501 comprises the user 101 providing a predetermined gesture along the display 108, which is touch sensitive in this illustrative embodiment. The user 101 may provide an unlocking input in other ways as well, such as entering a PIN, actuating a voice unlocking command, fingerprint scan, retina scan, and so forth. Note that in FIG. 5, the electronic device 100 is operably coupled or connected to the predefined peripheral accessory 300 while the control circuit (208) receives the unlocking input 501.

Figure 6:
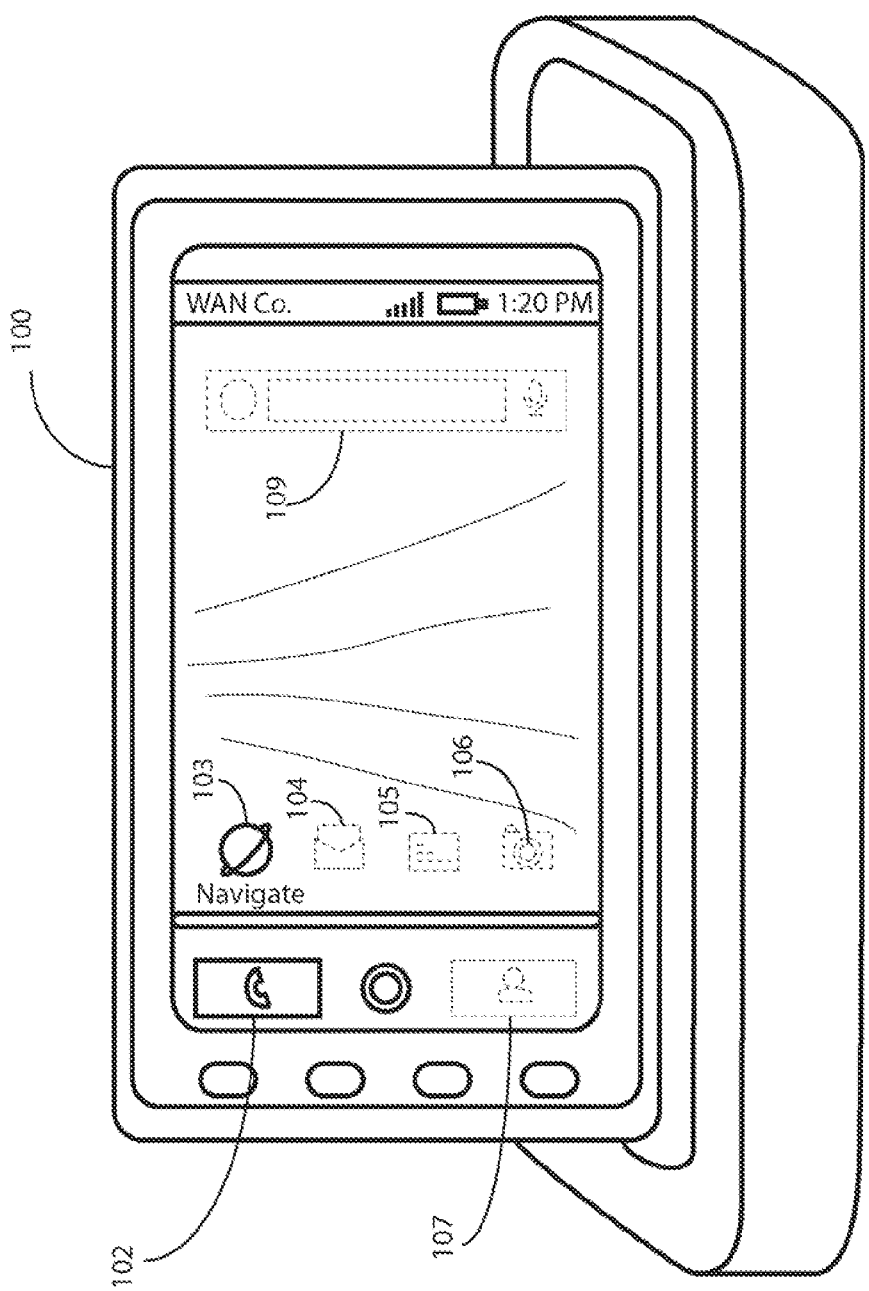
FIG. 6 illustrates one explanatory electronic device being operably coupled to a peripheral hardware device and offering limited usage in accordance with one or more embodiments of the invention.

Turning now to FIG. 6, the control circuit (208) of the electronic device 100, in response to locally receiving the unlocking input (501) from the user (101), and working with the selective unlocking module (213) and the application usage module (211), has performed an unlocking operation to transition the electronic device 100 from a locked state to an unlocked state. However, as shown in FIG. 6, after performing the unlocking operation, at least some of the applications 104, 105, 106, 107, 109, which are otherwise available for use in the unlocked state (see, e.g., FIG. 1), are precluded from use. In this illustrative embodiment, these applications 104, 105, 106, 107, 109 remain locked. Further, the applications 104, 105, 106, 107, 109 will remain locked until the electronic device 100 is disconnected from the predefined peripheral accessory 300 and unlocked in this illustrative embodiment. The navigation application 103 and the telephone application 102 are both available for use as normal.

Figure 7:
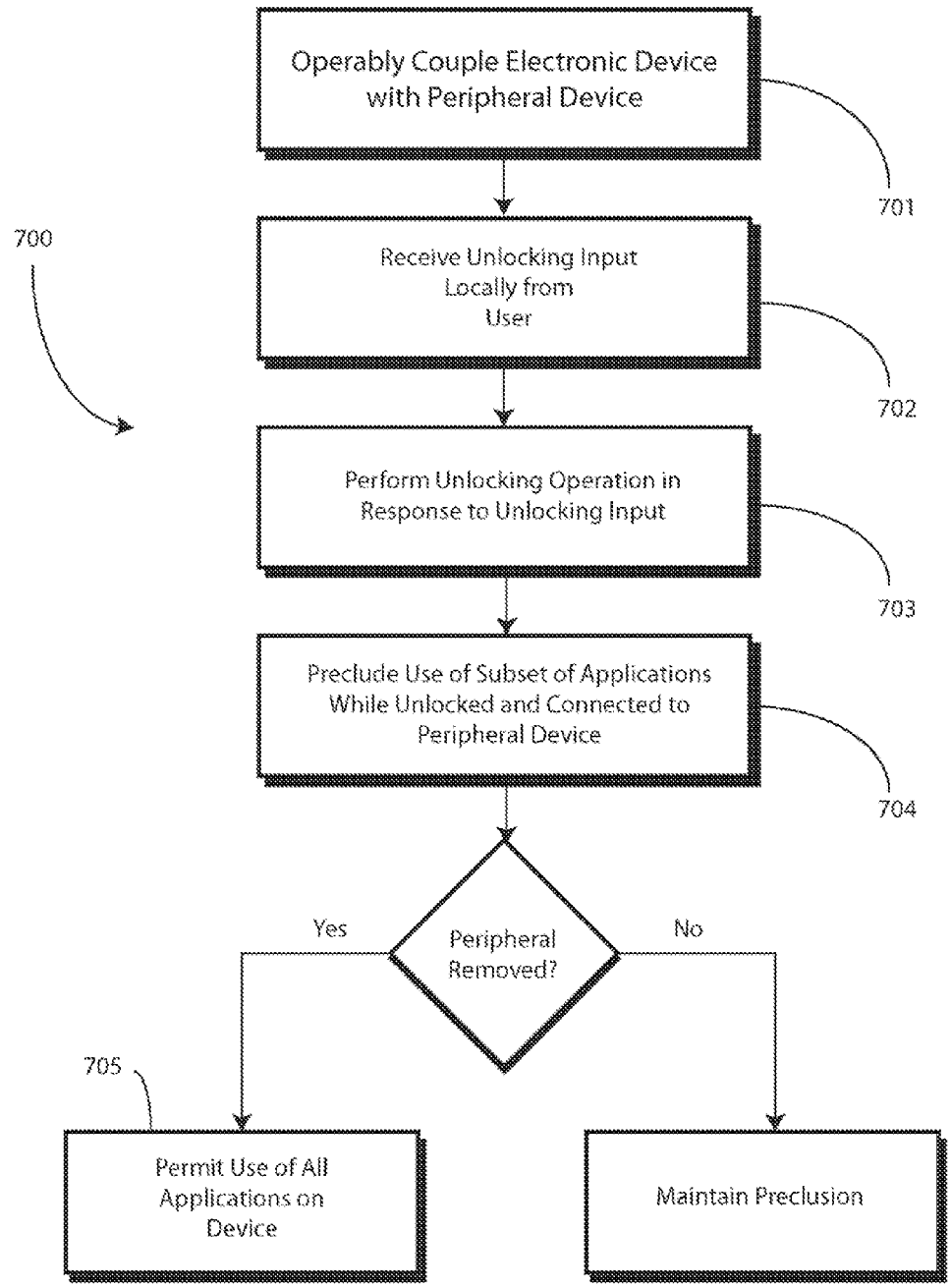
FIG. 7 illustrates one explanatory method of providing limited usage of an electronic device configured in accordance with one or more embodiments of the invention.

Turning now to FIG. 7, illustrated therein is a method 700 of providing limited usage of an electronic device. Many of the steps of the method 700 have been described above with reference to the examples provided in FIGS. 2-6. The method 700 of FIG. 7 is suitable for configuration as executable code to be operable with one or more processors, such as the control circuit of an electronic device.

At step 701, an electronic device is operably coupled with a peripheral device. In one embodiment, this step 701 comprises physically coupling the electronic device to the peripheral device. In other embodiments, this step 701 comprises wirelessly communicating with the peripheral device. Examples of peripheral devices include docking stations, chargers, power supplies, vehicular docking stations, and so forth. Others will be obvious to those of ordinary skill in the art having the benefit of this disclosure.

Figure 8:
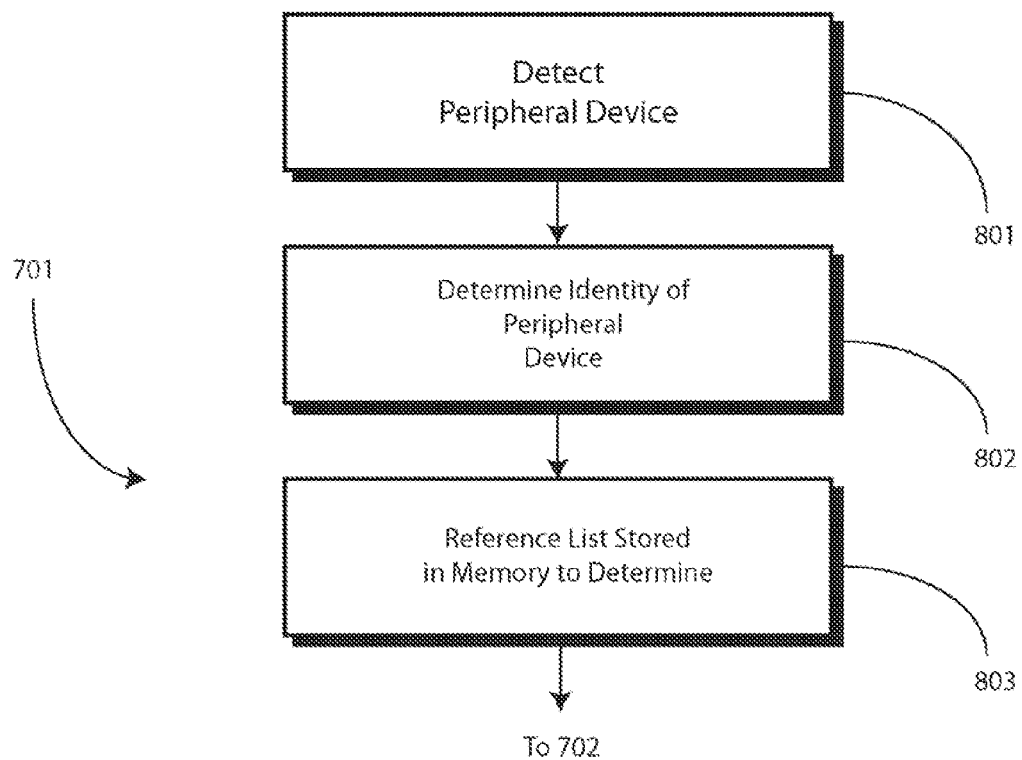
FIG. 8 illustrates another explanatory method of providing limited usage of an electronic device configured in accordance with one or more embodiments of the invention.

The step 701 of operably coupling the electronic device to the peripheral device can optionally include several sub-steps. These sub-steps in which the application usage module (211) performs the "control" of application usage preclusion are shown in FIG. 8. The sub-steps in which the secure memory (331) of a peripheral accessory (300) perform the control are shown in FIG. 10.

Turning initially to FIG. 8, the step 701 of operably coupling can include the step 801 of detecting the peripheral device. In one embodiment, this step 801 is performed by electronically communicating with the peripheral device to determine a generic identifier, a specific identifier, or otherwise making an electronic detection with the peripheral device. At step 802, the identity of the peripheral device is determined. To determine whether application preclusion should apply with the peripheral device detected at step 801, step 803 can include referencing a stored list of peripheral devices in the electronic device. The precluding step may then only occur where the identity of the peripheral device is found in the stored list of peripheral devices.

Figure 10:
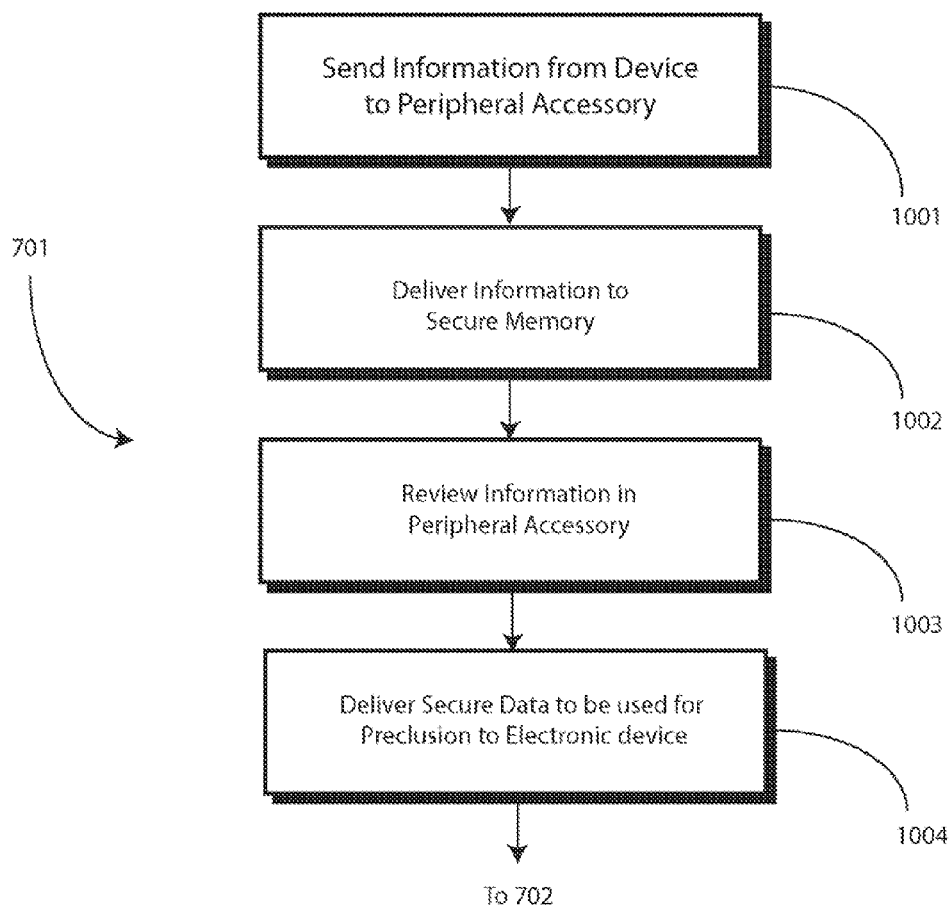
FIG. 10 illustrates another explanatory method of providing limited usage of an electronic device configured in accordance with one or more embodiments of the invention.

Turning now to FIG. 10, the step 701 of operably coupling can include the step 1001 of sending information to the peripheral accessory. In one embodiment, the information can include an identifier of the electronic device. In another embodiment, the information can include a security level corresponding to a user of the electronic device as previously described. Other data can be included in the information as well, such as the manufacturer, model, or serial number of the electronic device, the serial number, and so forth.

At step 1002, the information is delivered to a secure memory or other circuitry disposed within the peripheral accessory. At step 1003, the secure memory can review the information to determine which applications should be precluded from usage. At step 1004, the secure memory can then provide secure data to the electronic device. In one embodiment, the secure data includes identification, capabilities, and access levels to the electronic device. At step 1004, the electronic device receives the secure data, which serves as a control input regarding to which applications usage or access should be precluded.

Turning now back to FIG. 7, at step 702, an unlocking input is received locally at a user interface of the electronic device. In one embodiment, this step 702 comprises receiving a PIN input or voice input, for example, from a user. In another embodiment, this step 702 comprises receiving a gesture input, such as a predefined gesture path, via a user input.

At step 703, an unlocking operation is performed in response to the unlocking input received at step 702. This unlocking operation transitions the electronic device form a locked state to an unlocked state. However, as shown at step 704, after performing the unlocking operation, at least some applications of the electronic device are precluded from use while the electronic device is operably coupled to the peripheral device. In one embodiment, this step 704 results in applications that are otherwise available for use when the electronic device is in the unlocked state, being unavailable for use, so long as the electronic device remains operably coupled to the peripheral device. In one embodiment, this step 704 comprises causing at least some applications to remain in a locked state. In some embodiments, this step 704 is not capable of being overridden by a user, while the electronic device is coupled or connected to the peripheral device. Accordingly, in such embodiments the user must remove the electronic device from the peripheral device and again unlock the electronic device to be able to use these applications as shown at step 705.

Figure 9:
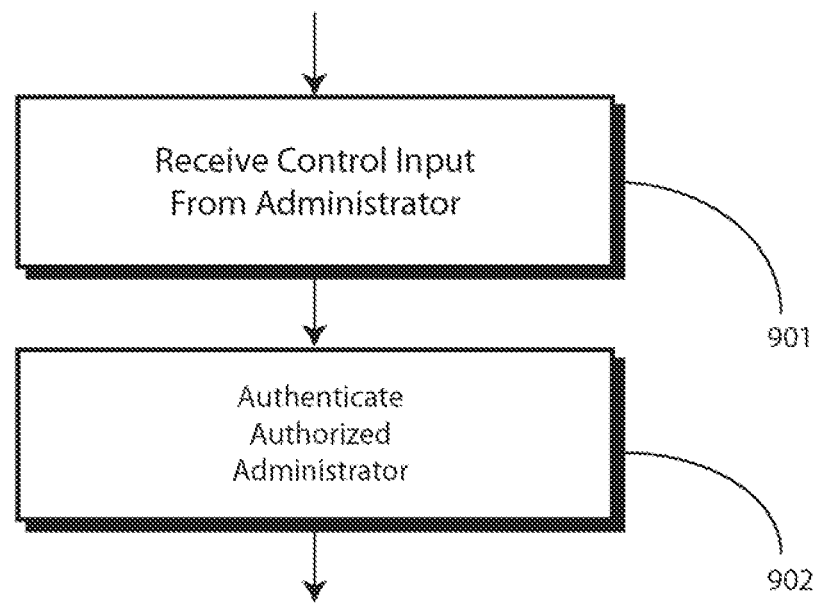
FIG. 9 illustrates an explanatory method for providing administrator control for one or more embodiments of the invention.

As noted above, in one or more embodiments an authorized administrator is capable of defining which applications should be precluded from use, with which peripheral devices these applications should be precluded, and so forth. Turning now to FIG. 9, illustrated therein is a method of performing these defining functions.

At step 901, control input defining which applications to preclude from use—and optionally which peripheral devices are to trigger this preclusion—when the electronic device is operably coupled with the peripheral device is received. This control input can be received from an administrator access module. Further, step 901 can include causing an administrator control module to lock in response to the control input to prevent user override of the one or more applications of the electronic device precluded from usage when the electronic device is unlocked by the user when operably connected to the predefined peripheral accessory. Step 901 can include an identifier of the applications to preclude from use, an identifier of peripheral devices with which applications should be precluded from use, or combinations of the two. In one embodiment, step 901 comprises receiving remote communications across a network from an administrator having usage privileges superior to user privileges of the electronic device.

At step 902, an authentication step can occur to ensure that the entity or device delivering the control input is actually an authorized administrator. In one embodiment, step 902 comprises receiving administrator credentials, such as a user name and a password. The administrator credentials can be user credentials where the user is established as an authorized administrator. However, in many embodiments, as noted in the preceding paragraph, the authorized administrator will have usage privileges that are superior to the user privileges. Accordingly, the administrator credentials can be parental control credentials, corporate IT credentials, enterprise usage credentials, and so forth. Other types of authorized administrators will be obvious to those of ordinary skill in the art having the benefit of this disclosure. Where the user has privileges that are different from an authorized administrator, the user credentials and the administrator credentials would, of course, be different.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising:
while operating in a locked state and operably connected to a peripheral device, receiving, by an electronic device, an indication of an unlocking input detected at a user interface of the electronic device, wherein one or more applications are prevented from being accessed, by a user and from the electronic device, while the electronic device is operating in the locked state;
responsive to receiving the indication of the unlocking input, transitioning, by the electronic device, from operating in the locked state to operating in an unlocked state;
identifying, by the electronic device, the peripheral device from a stored list of peripheral devices, the stored list including information specifying at least one application from the one or more applications that is to be prevented from being accessed, by the user and from the electronic device, while the electronic device is operating in the unlocked state and is operably connected to the peripheral device;
responsive to identifying the peripheral device from the stored list of peripheral devices, and while the electronic device is operating in the unlocked state and is operably connected to the peripheral device, preventing, by the electronic device, the at least one application from being accessed by the user and from the electronic device; and
allowing, by the electronic device, the at least one application to be accessed, by the user from the electronic device, while the electronic device is operating in the unlocked state and is operably disconnected from the peripheral device.

2. The method of claim 1, further comprising:
receiving, by the electronic device, an indication of a control input defining which applications to prevent from being accessed, by the user and from the electronic device, while the electronic device is operably connected to the peripheral device, wherein the at least one application is further determined based at least in part on the control input.

3. The method of claim 2, wherein the control input further defines an identifier of the peripheral device and the at least one application is further determined in response to determining, by the electronic device, based on the identifier, that the electronic device is operably connected to the peripheral device.

4. The method of claim 2, wherein the indication of the control input is received from a remote computing system associated with an administrator of the electronic device, the administrator of the electronic device having usage privileges associated with the electronic device that are superior to user privileges of the electronic device.

5. The method of claim 4, further comprising:
receiving, by the electronic device, from the remote computing system, administrator credentials; and
determining, by the electronic device, based on the administrator credentials, that the administrator is authorized to provide the control input, wherein the at least one application is further determined in response to the determination.

6. The method of claim 1, wherein the electronic device is operably connected to the peripheral device via a wireless communication link.

7. A method, comprising:
receiving, at an administrator control module of an electronic device, information defining one or more applications of the electronic device that are to be prevented from being accessed, by a user and from the electronic device, while the electronic device is operating in an unlocked state and is operably connected to a peripheral accessory;
configuring, by the administrator control module, based on the information, the electronic device to prevent access, by the user and from the electronic device, to the one or more applications while the electronic device is operating in the unlocked state and is operably connected to the peripheral accessory;
responsive to determining that the electronic device is operating in the unlocked state and is operably connected to the peripheral accessory, preventing, by the administrator control module, access, by the user and from the electronic device, to the one or more applications; and
responsive to determining that the electronic device is operating in the unlocked state and is operably disconnected from the peripheral accessory, allowing, by the administrator control module, access, by the user and from the electronic device, to the one or more applications.

8. The method of claim 7, further comprising:
subsequent to configuring the electronic device to prevent access, by the user and from the electronic device, to the one or more applications, inhibiting, by the administrator control module, access to the administrator control module to prevent changes to the configuration of the electronic device that prevents access, by the user and from the electronic device, to the one or more applications.

9. The method of claim 7, further comprising:
responsive to determining that the electronic device is operably disconnected from the peripheral accessory, configuring, by the administrator control module, the electronic device to permit access, by the user and from the electronic device, to the one or more applications.

10. A peripheral accessory, comprising:
a communication circuit for exchanging secure data and information with an electronic device, the information specifying one or more applications of the electronic device that are accessible from the electronic device, the secure data defining at least one of the one or more applications that is to be prevented from being accessed, by a user and from the electronic device, while the electronic device is operating in an unlocked state and is operably connected to the peripheral accessory and is allowed to be accessed, by the user and from the electronic device, while the electronic device is operating in the unlocked state and is operably disconnected from the peripheral device;
a processor; and
a secure memory module operable by the processor to:
   receive, via the communication circuit, from the electronic device, the information;
   determine, based on the information, the at least one of the one or more applications that is to be prevented from being accessed, by a user and from the electronic device, while the electronic device is operating in an unlocked state and is operably connected to the peripheral accessory; and
   transmit, via the communication circuit, to the electronic device, the secure data defining the at least one of the one or more applications.

11. The peripheral accessory of claim 10, further comprising a secure crypto memory configured to store the secure data defining the one or more applications, wherein the secure memory module is further operable by the processor to retrieve, from the secure crypto memory, the secure data.

12. The peripheral accessory of claim 10, wherein the information comprises at least one of an identifier of the electronic device or a security level indicator associated with a user of the electronic device, wherein the secure memory module is further operable by the processor to determine, based on at least one of the identifier of the electronic device or the security level indicator associated with the user, the at least one of the one or more applications.

13. The method of claim 1, wherein the peripheral device is a first peripheral device, the unlocking input is a first unlocking input, and the at least one application is a first application, the method further comprising:
   while operating in the locked state and being operably connected to a second peripheral device, receiving, by the electronic device, an indication of a second unlocking input detected at the user interface of the electronic device;
   responsive to receiving the indication of the second unlocking input, transitioning, by the electronic device, from operating in the locked state to operating in the unlocked state;
   identifying, by the electronic device, the second peripheral device from the stored list of peripheral devices, wherein the information included in the stored list further specifies that a second application from the one or more applications that is to be prevented from being accessed, by a user and from the electronic device, while the electronic device is in the unlocked state and is operably connected to the second peripheral device; and
   responsive to identifying the second peripheral device from the stored list of peripheral devices, and while operating in the unlocked state and being operably connected to the second peripheral device, preventing, by the electronic device, the second application from being accessed, by the user and from the electronic device.

14. The method of claim 13, further comprising while operating in the unlocked state, while being operably connected to the second peripheral device, and while being operably disconnected from the first peripheral device, allowing, by the electronic device, the first application to be accessed, by the user and from the electronic device.

15. The method of claim 14, further comprising while operating in the unlocked state, while being operably connected to the second peripheral device, and while being operably connected to the first peripheral device, preventing, by the electronic device, the first application and the second application from being accessed, by the user and from the electronic device.

16. The method of claim 1, further comprising:
   while operating in the unlocked state and after preventing the at least one application from being accessed by the user and from the electronic device and responsive to determining that the electronic device is operably disconnected from the peripheral device, allowing, by the electronic device, the at least one application to be accessed, by the user and from the electronic device.

17. An electronic device comprising:
an input device configured to detect unlocking inputs;
a processor; and
at least one module operable by the processor to:
   while the electronic device operates in a locked state and is operably connected to a peripheral device, receive, an indication of an unlocking input detected at the input device, wherein one or more applications are prevented from being accessed, by a user and from the electronic device, while the electronic device operates in the locked state;
   responsive to receiving the indication of the unlocking input, transition the electronic device from operating in the locked state to operating in an unlocked state;
   identify the peripheral device from a stored list of peripheral devices, the stored list including information specifying at least one application from the one or more applications that is to be prevented from being accessed, by the user and from the electronic device, while the electronic device operates in the unlocked state and is operably connected to the peripheral device;
   responsive to identifying the peripheral device from the stored list of peripheral devices, and while the electronic device operates in the unlocked state and is operably connected to the peripheral device, prevent the at least one application from being accessed, by the user and from the electronic device; and
   allow the at least one application to be accessed, by the user from the electronic device, while the electronic device operates in the unlocked state and is operably disconnected from the peripheral device.

18. The electronic device of claim 17, wherein the at least one module is further operable by the processor to configure the at least one application to be accessible, by the user and from the electronic device, while the electronic device operates in the locked state and is operably disconnected from the peripheral device.

19. The electronic device of claim 17, wherein the at least one module is further operable by the processor to:
   receive an indication of a control input defining which applications to prevent from being accessed, by the user and from the electronic device, while the electronic device is operably connected to the peripheral device; and
   determine the at least one application based at least in part on the indication of the control input.

20. The electronic device of claim 17, wherein the peripheral device is a first peripheral device, the unlocking input is a first unlocking input, the at least one application is a first application, and the at least one module is further operable by the processor to:

while the electronic device is operating in the locked state and is operably connected to a second peripheral device, receive an indication of a second unlocking input detected at the input device;

responsive to receiving the indication of the second unlocking input, transition the electronic device from operating in the locked state to operating in the unlocked state;

identify the second peripheral device from the stored list of peripheral devices, wherein the information included in the stored list further specifies that a second application from the one or more applications that is to be prevented from being accessed, by the user and from the electronic device, while the electronic device is in the unlocked state and is operably connected to the second peripheral device; and responsive to identifying the second peripheral device from the stored list of peripheral devices, and while the electronic device operates in the unlocked state and is operably connected to the second peripheral device, prevent the second application from being accessed, by the user and from the electronic device.

21. The electronic device of claim 20, wherein the at least one module is further operable by the processor to, while the electronic device operates in the unlocked state, is operably connected to the second peripheral device, and is operably disconnected from the first peripheral device, allow the first application to be accessed, by the user and from the electronic device.

* * * * *